(12) United States Patent
Hanusiak et al.

(10) Patent No.: US 10,146,569 B2
(45) Date of Patent: Dec. 4, 2018

(54) TEMPLATE BASED SOFTWARE SCANS

(71) Applicant: INTERNATIONAL BUSINESS MACHINES CORPORATION, Armonk, NY (US)

(72) Inventors: Tomasz Hanusiak, Cracow (PL); Michal Klak, Zielonki (PL); Konrad Wojciech Komnata, Cracow (PL); Konrad K. Skibski, Zielonki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 15/058,296

(22) Filed: Mar. 2, 2016

(65) Prior Publication Data
US 2017/0255483 A1  Sep. 7, 2017

(51) Int. Cl.
*G06F 9/455* (2018.01)
*G06F 15/173* (2006.01)
*G06F 8/70* (2018.01)
*G06F 8/61* (2018.01)
*G06F 9/50* (2006.01)
*G06F 8/20* (2018.01)
*G06F 8/71* (2018.01)

(52) U.S. Cl.
CPC ............ *G06F 9/45558* (2013.01); *G06F 8/20* (2013.01); *G06F 8/63* (2013.01); *G06F 8/70* (2013.01); *G06F 8/71* (2013.01); *G06F 9/455* (2013.01); *G06F 9/45533* (2013.01); *G06F 9/5077* (2013.01); *G06F 2009/45579* (2013.01); *G06F 2009/45583* (2013.01)

(58) Field of Classification Search
CPC .. G06F 9/455; G06F 9/45533; G06F 9/45558; G06F 8/70; G06F 8/71; G06F 8/20
See application file for complete search history.

(56) References Cited

U.S. PATENT DOCUMENTS

| 8,819,190 | B2 * | 8/2014 | Pafumi | G06F 8/63 709/208 |
|---|---|---|---|---|
| 8,972,987 | B2 | 3/2015 | Ciano et al. | |

(Continued)

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

*Primary Examiner* — Charles M Swift
(74) *Attorney, Agent, or Firm* — Richard A. Wilhelm; Matthew M. Hulihan; Heslin Rothenberg Farley & Mesiti PC

(57) ABSTRACT

A discovery process to determine the software products deployed on machines of a computing environment. A machine obtains at least one of a deployment image or a software catalog to be used in determining products deployed on the machine. The deployment image and the software catalog are generated based on scanning a template used to create the machine. The deployment image includes information of one or more products in the template and the software catalog includes additional information for at least one product of the one or more products. The machine uses at least one of the deployment image or the software catalog to discover products deployed on the machine.

20 Claims, 10 Drawing Sheets

(56) References Cited

U.S. PATENT DOCUMENTS

| | | | |
|---|---|---|---|
| 8,997,245 B2 | 3/2015 | Chen et al. | |
| 9,122,998 B2 | 9/2015 | Boudreau et al. | |
| 2006/0253849 A1* | 11/2006 | Avram | G06F 9/445 |
| | | | 717/172 |
| 2008/0127169 A1* | 5/2008 | Malasky | G06F 8/61 |
| | | | 717/174 |
| 2012/0030072 A1* | 2/2012 | Boudreau | G06Q 10/00 |
| | | | 705/30 |
| 2012/0246645 A1* | 9/2012 | Iikura | G06F 8/61 |
| | | | 718/1 |
| 2013/0174138 A1 | 7/2013 | Kania et al. | |
| 2013/0232480 A1* | 9/2013 | Winterfeldt | G06F 8/60 |
| | | | 717/177 |
| 2013/0263113 A1* | 10/2013 | Cavazza | G06F 8/63 |
| | | | 717/178 |
| 2013/0268913 A1* | 10/2013 | Anderson | G06F 8/70 |
| | | | 717/120 |
| 2014/0053145 A1* | 2/2014 | Steigleder | G06F 8/65 |
| | | | 717/169 |
| 2014/0068549 A1* | 3/2014 | Friedman | G06F 8/30 |
| | | | 717/104 |
| 2015/0039875 A1* | 2/2015 | Di Cocco | G06F 9/4416 |
| | | | 713/2 |
| 2015/0089473 A1 | 3/2015 | Gocek et al. | |
| 2016/0335113 A1* | 11/2016 | Gorst | G06F 9/45558 |

\* cited by examiner

TEMPLATE BASED SOFTWARE SCANS

BACKGROUND

One or more aspects relate, in general, to computing environments, and in particular, to software discovery within such environments.

Software discovery is performed in many computing environments to determine which products are being used by which machines. This information is then used, for instance, to appropriately invoice for such products or to determine licensing rights, etc.

In large computing environments, such as virtualized computing environments, scanning all of the machines to determine what products are deployed thereon may be time-consuming and/or require significant computing resources.

SUMMARY

Shortcomings of the prior art are overcome and additional advantages are provided through the provision of a computer program product for performing discovery within a computing environment. The computer program product comprises a storage medium readable by a processing circuit and storing instructions for execution by the processing circuit for performing a method. The method includes, for instance, obtaining, by a machine of the computing environment, at least one of a deployment image or a software catalog to be used in determining products deployed on the machine, the at least one of the deployment image or the software catalog generated based on scanning a template used to create the machine, the deployment image comprising information of one or more products in the template and the software catalog comprising additional information for at least one product of the one or more products; and using, by the machine, at least one of the deployment image or the software catalog to discover products deployed on the machine.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a discovery process is provided that increases the speed at which discovery within a computing environment, such as a large virtualized environment, is performed. The discovery process employs scans that are based on templates used to create the machines.

For instance, in large computing environments, such as virtualized computing environments, there may be many machines that have very similar products deployed thereon. This may be due to the fact that machines are populated based on some initial templates. Thus, to increase the speed of discovery, these templates are used in a scan process performed during discovery.

One example of a computing environment to incorporate and use one or more aspects of a discovery process is described with reference to FIG. 1. A discovery process may be employed in many different computing environments implemented based on various computing architectures. One such architecture is the x86 architecture offered by Intel Corporation, Santa Clara, Calif. However, other architectures, including architectures offered by International Business Machines Corporation, Armonk, N.Y., and/or other companies, may employ a discovery process used to determine the software deployed on machines within the computing environment.

Figure 1:
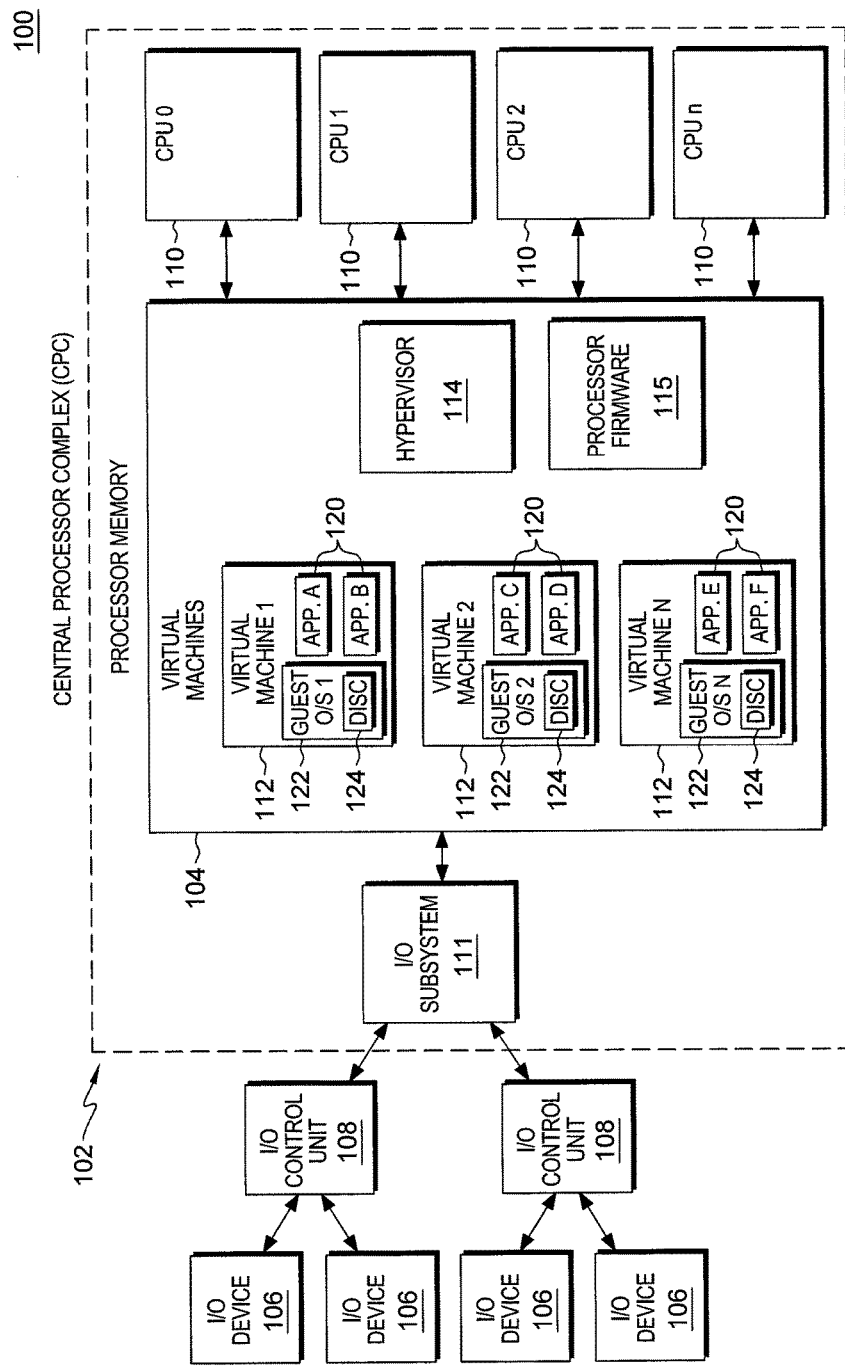
FIG. 1 depicts one example of a virtual computing environment to incorporate and use one or more aspects of a discovery process, in accordance with one or more aspects of the present invention.

Referring to FIG. 1, in one example, computing environment 100 includes a central processor complex 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114 that manages the virtual machines, and processor firmware 115. Examples of hypervisor 114 include, for instance, Hyper-V offered by Microsoft Corporation, Redmond, Wash.; ESX and vSphere offered by VMware, Palo Alto, Calif.; and XenServer offered by Citrix Systems, Inc., Fort Lauderdale, Fla., as well as others. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux or other operating systems. Each operating system may include a discovery process 124 to be used to discover the deployed products (e.g., software products) on the virtual machine in which the operating system is executing.

Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine.

Further, processor memory 104 is coupled to an I/O subsystem 111. Input/output subsystem 111 directs the flow of information between input/output devices 106 and main storage 104. It is coupled to the central processing complex, in that it can be a part of the central processing complex or separate therefrom.

Figure 2A:
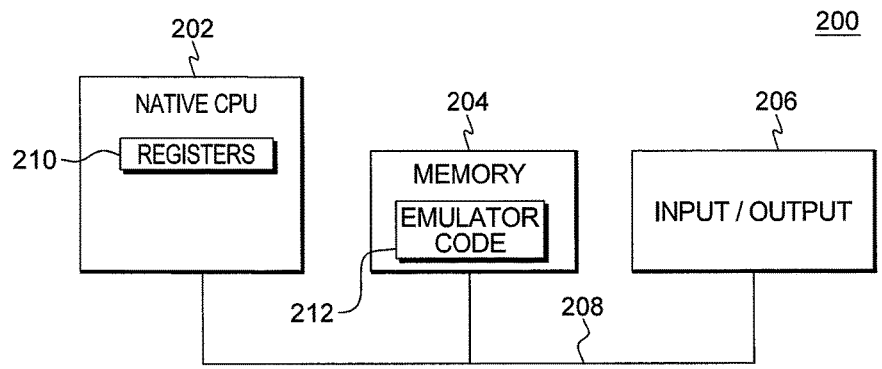
FIG. 2A depicts another example of a computing environment to incorporate and use one or more aspects of a discovery process, in accordance with one or more aspects of the present invention.

Another example of a computing environment to incorporate and use one or more aspects of the discovery process is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a zSeries server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures.

Figure 2B:
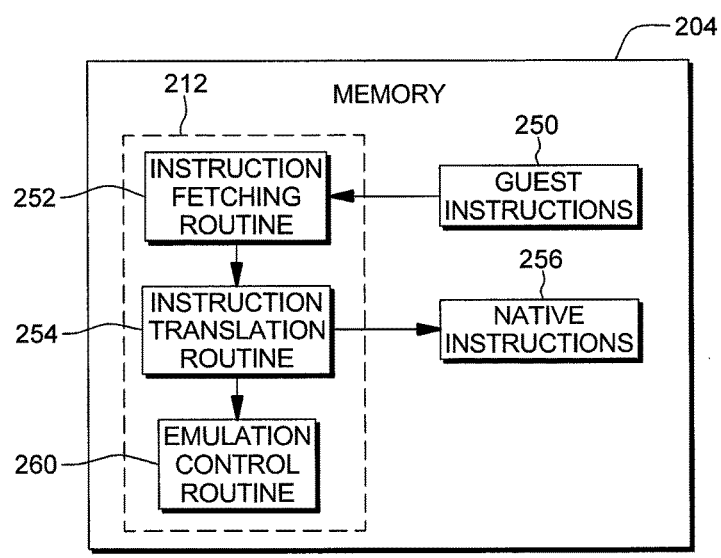
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on an x86 processor or other processor, but instead, are being emulated on native CPU 202, which may be, for example, a z/Architecture processor or other processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

In one example, the guest instructions may include instructions employed as part of the discovery process, in accordance with an aspect of the present invention.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

In accordance with an aspect of the present invention, a discovery process is employed to determine what products, e.g., software products, are deployed on a machine of the computing environment. This information may be used for rights determination (e.g., licensing rights), invoicing, licensing, etc.

One embodiment of the logic to perform discovery is described with reference to FIG. 3. In one example, this logic is performed by an operating system executing on a virtual machine of the computing environment. In another example, the logic is performed by another component of the computing environment.

Figure 3:
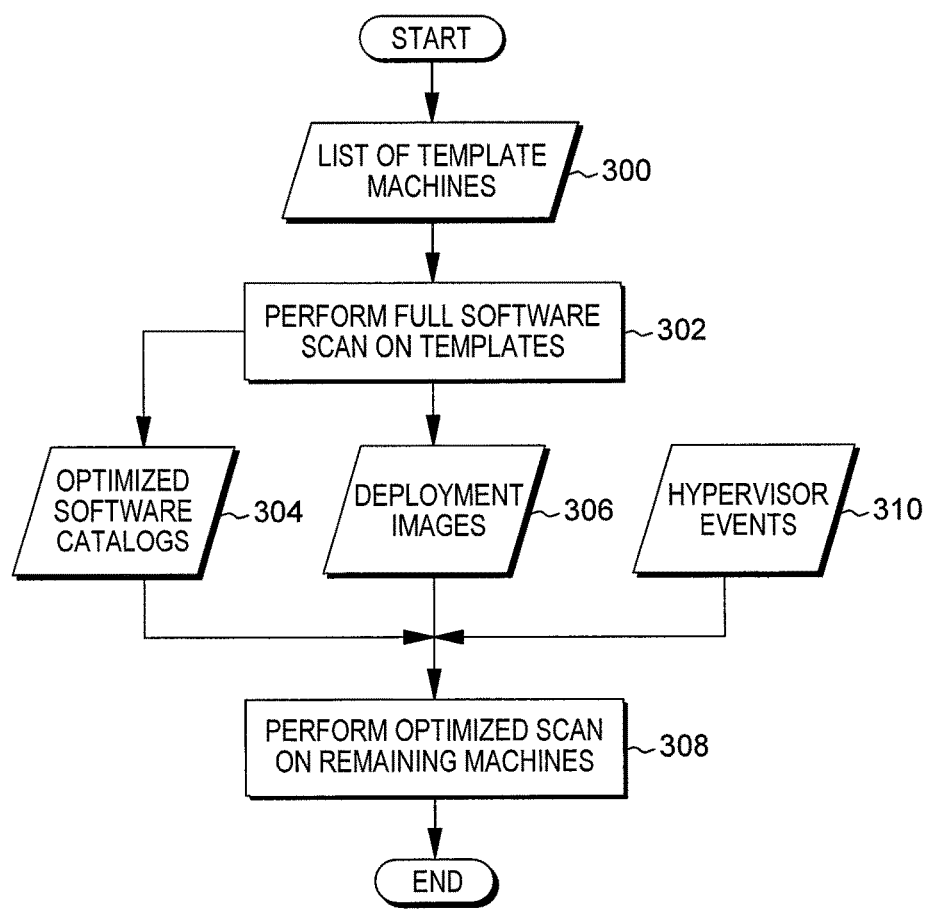
FIG. 3 depicts one embodiment of logic to perform discovery within a computing environment, in accordance with one or more aspects of the present invention.

Referring to FIG. 3, in one embodiment, the discovery logic obtains a list of templates that have been used to generate one or more machines of the computing environment, such as one or more virtual machines of a virtual computing environment, STEP 300. This list may be provided by a user or obtained from the hypervisor, as examples. As used herein, obtains includes, but is not limited to, being provided, receiving, retrieving, etc.

Based on obtaining the list of templates, a software scan is performed on each of the templates, STEP 302. This scan includes scanning all of the files, directories, etc. of a template to determine the products (e.g., software products) included in the template. The output of this scan includes, for each template, an optimized software catalog 304 and a deployment image 306. Each deployment image 306 includes a list of products found in the scan, as well as attributes associated with each product, including, for instance, signature used, installation paths, operating system specifics, process names, etc. Further, each optimized software catalog 304 includes additional attributes for one or more of the products, including other possible versions, other locations of installation, licensing terms, etc. Each catalog 304 provides an alternative way of identifying products included within the catalog for the template.

Optimized software catalogs 304 and deployment images 306 are then used to perform discovery on machines of the computing environment, STEP 308. In particular, for each machine (e.g., each virtual machine) to be discovered, a deployment image and an optimized software catalog are distributed to that machine for use by the operating system of that machine to perform discovery. In one embodiment, the deployment image and optimized software catalog to be distributed to a particular machine are determined based on hypervisor events 310.

Hypervisor events 310 are used to indicate which templates were used to generate which machines. For instance, the hypervisor events may indicate that template T1 was used to generate machines V1, V2 and V3, and template T2 was used to generate machine V4. Other information may also be included as events. Based on the hypervisor events, a deployment image and optimized software catalog are selected and provided to an operating system of a machine to be discovered, and an optimized scan is performed.

Further details relating to performing an optimized scan are described with reference to FIG. 4. The optimized scan is performed by an operating system (or other component) of a machine to be discovered.

Figure 4:
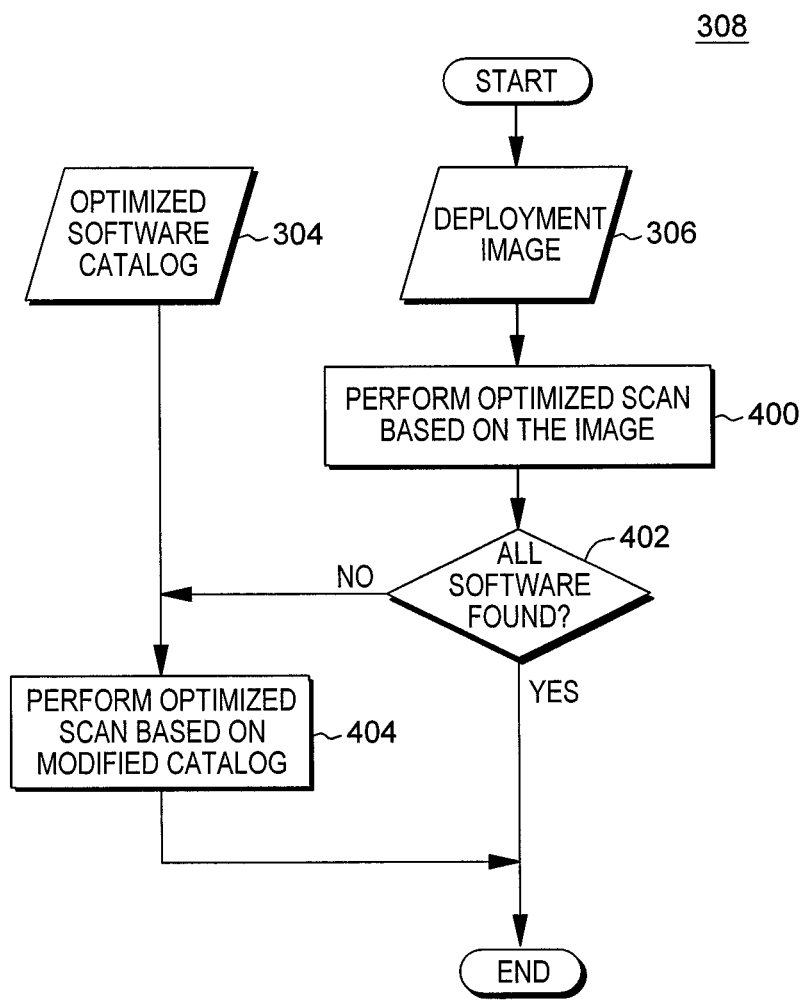
FIG. 4 depicts one embodiment of logic to perform an optimized scan as part of the discovery process of FIG. 3, in accordance with one or more aspects of the present invention.

Referring to FIG. 4, initially, a deployment image 306 for the machine being scanned is received as input to the scan logic, STEP 400. Again, this deployment image is selected based on the hypervisor events. For instance, hypervisor events 310 may indicate that for a virtual machine V1 deployment image D1 is to be used.

The scan process includes, for instance, checking within the machine being discovered whether the products included in the deployment image are found in the machine at the locations indicated in the deployment image. If all of the products are found in the locations specified in the deployment image, INQUIRY 402, then the process is complete. That is, the products for the machine have been discovered.

However, returning to INQUIRY 402, if all of the products have not been found in their specified locations, then a selected optimized software catalog 304 is input to a further scan to determine if the products are located at different locations, etc., as indicated in the selected software catalog, STEP 404. The selected software catalog is also indicated based on the hypervisor events. For instance, hypervisor events 310 may further indicate that for virtual machine V1 catalog C1 is to be used. The further scan scans the machine based on the catalog to determine whether the missing products are, for example, located in the alternative locations indicated in the catalog and/or in different versions as specified in the catalog. The output of this scan provides an indication of the products located on this machine. This completes the discovery process for this machine.

The above process is repeated for each machine of the computing environment to be discovered.

Described in detail herein is an optimized process for discovering the software products on machines of a computing environment, such as virtual machines of a virtualized environment. The process includes generating one or more templates for one or more machines, in which each template includes one or more software products that may be deployed on one or more machines generated by that template. The templates are then used in a discovery process of machines of the computing environment. A full software scan is performed on the templates to obtain deployment images and optimized software catalogs, which are used to perform optimized scans on the machines of the computing environment.

One example of using the discovery process is described below:

Template T1 had products P1, P2, P3, P4 installed.
Template T2 had products P5, P6 installed.
Product P4 was not fully installed on Template T1 (e.g., due to licensing, it has to be completed individually on each machine). Final installation can modify the paths/signatures of the product deployment.
Template T1 was used to produce machines V1, V2, V3.
Template T2 was used to produce machine V4.
Installation of product P4 was completed on machine V3.
Full software scans are performed on T1 and T2. Modified catalog C1 and C2, as well as deployment images D1 and D2 are produced.
Hypervisor's data informs the process to scan machines V1-V3 using C1 and D1, and to scan machine V4 using C2 and D2.
Deployment image (D1) scan detects products P1-P3 on machines V1-V3. Product P4 has not been found on machine V3; on other machines, it has been found, but it is marked as not active.
Catalog scan finds the P4 product on machine V3 and it is set to active.
Deployment image (D2) scan detects products P5, P6 on machine V4.

Figure 5A:
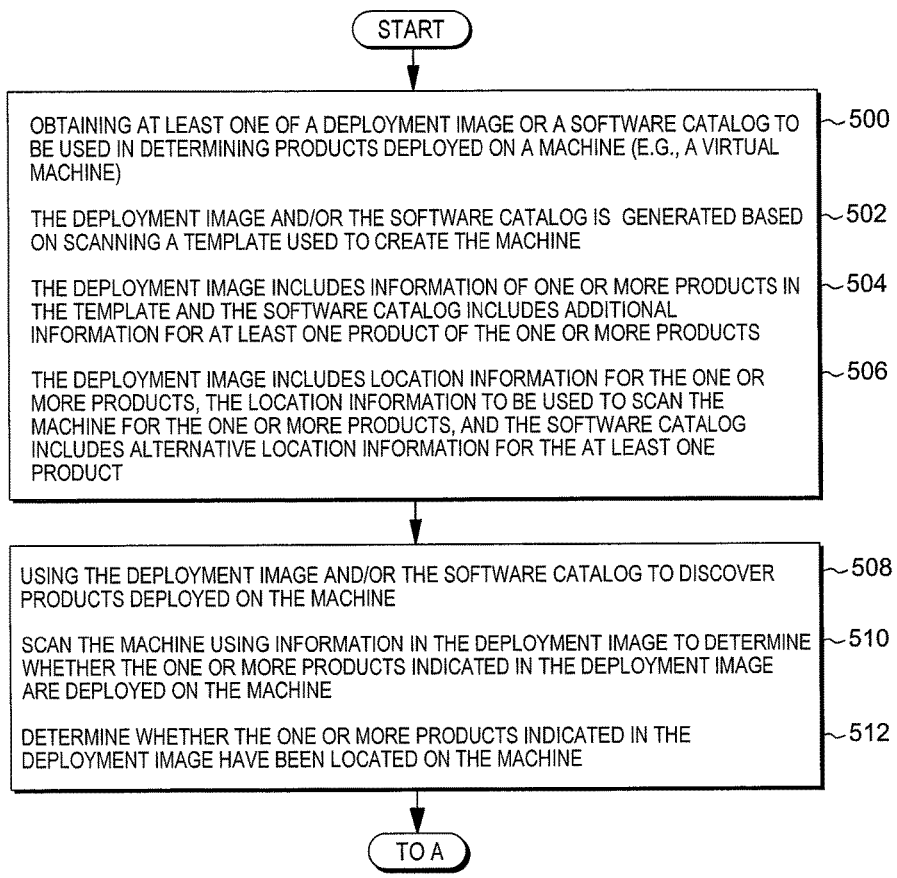
FIGS. 5A-5C depict one embodiment of further details for performing discovery of deployed products within a computing environment, in accordance with one or more aspects of the present invention.
Figure 5B:
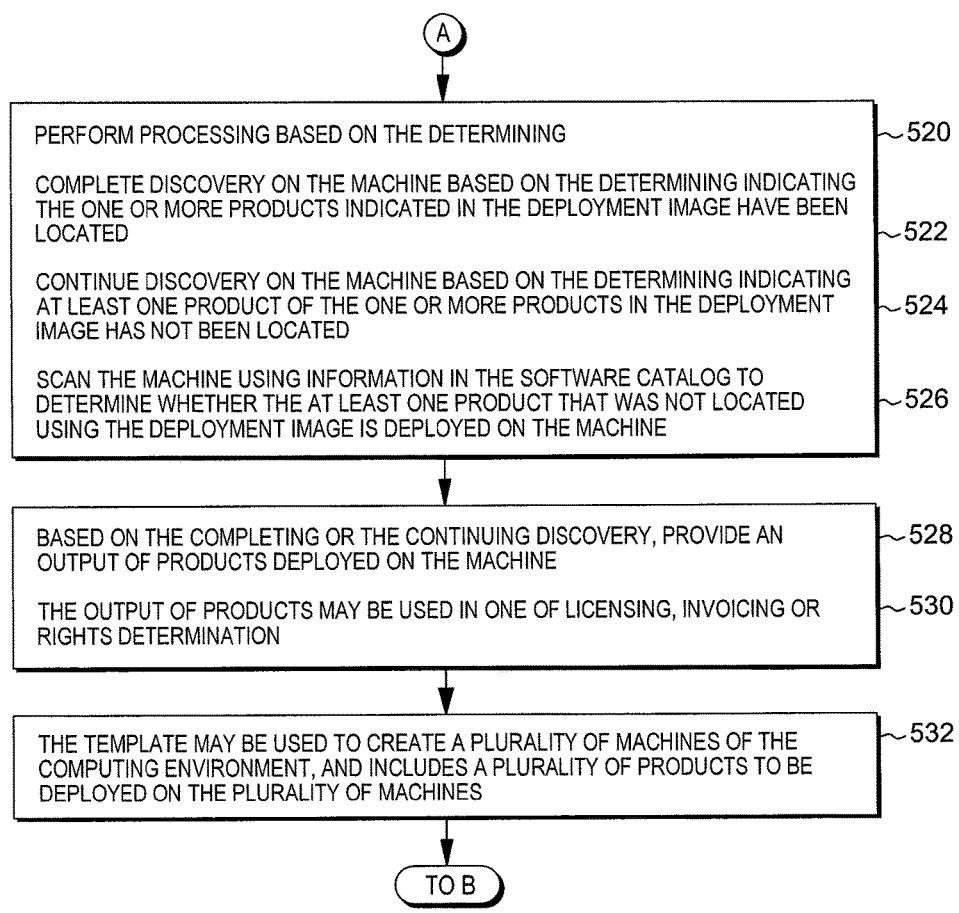
Figure 5C:
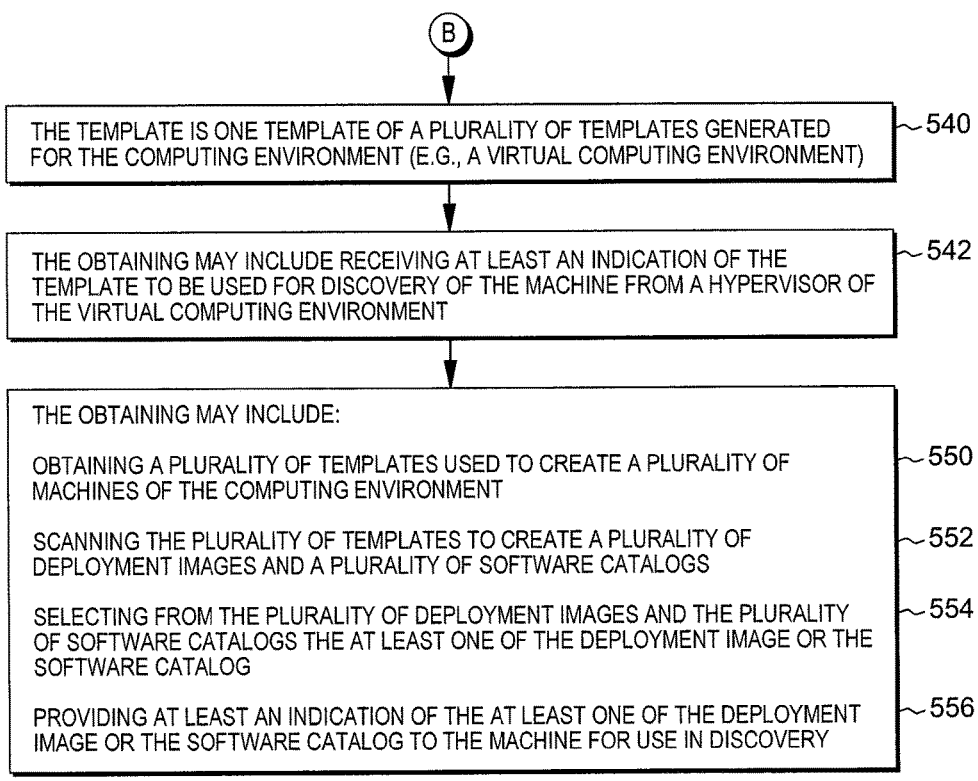

Further details of one embodiment of performing discovery within a computing environment are described with reference to FIGS. 5A-5C. In one example, a machine of the computing environment obtains at least one of a deployment image or a software catalog to be used in determining products deployed on the machine (e.g., a virtual machine), STEP 500. The deployment image and/or the software catalog is generated based on scanning a template used to create the machine, STEP 502. In one example, the deployment image includes information of one or more products in the template and the software catalog includes additional information for at least one product of the one or more products, STEP 504. The deployment image includes, for instance, location information for the one or more products, the location information to be used to scan the machine for the one or more products, and the software catalog includes alternative location information for the at least one product, STEP 506. The software catalog may also, or alternatively, include different versions of the at least one product, which information is used in locating the at least one product. Other examples are also possible.

The deployment image and/or the software catalog are used to discover products deployed on the machine, STEP 508. This includes, for instance, scanning the machine using information in the deployment image to determine whether the one or more products indicated in the deployment image are deployed on the machine, STEP 510. A determination is made as to whether the one or more products indicated in the deployment image have been located on the machine, STEP 512. Based on the determining, processing is performed, STEP 520. For instance, discovery is completed on the machine, based on the determining indicating the one or more products indicated in the deployment image have been located, STEP 522. Further, discovery is continued on the machine, based on the determining indicating at least one product of the one or more products in the deployment image has not been located, STEP 524. The continuing discovery includes, for instance, scanning the machine using information in the software catalog to determine whether the at least one product that was not located using the deployment image is deployed on the machine, STEP 526. Based on the completing or the continuing discovery, an output of products deployed on the machine is provided, STEP 528. The output of products may be used in one of licensing, invoicing or rights determination, as examples, STEP 530.

In one embodiment, the template may be used to create a plurality of machines of the computing environment, and includes a plurality of products to be deployed on the plurality of machines, STEP 532.

In a further embodiment, a plurality of templates are generated for the computing environment (e.g., a virtual computing environment), STEP 540, and the obtaining includes receiving at least an indication of the template to be used for discovery of the machine from a hypervisor of the virtual computing environment, STEP 542.

Additionally, the obtaining may include obtaining a plurality of templates used to create a plurality of machines of the computing environment, STEP 550, scanning the plurality of templates to create a plurality of deployment images and a plurality of software catalogs, STEP 552, selecting from the plurality of deployment images and the plurality of software catalogs the at least one of the deployment image or the software catalog, STEP 554, and providing at least an indication of the at least one of the deployment image or the software catalog to the machine for use in discovery, STEP 556.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
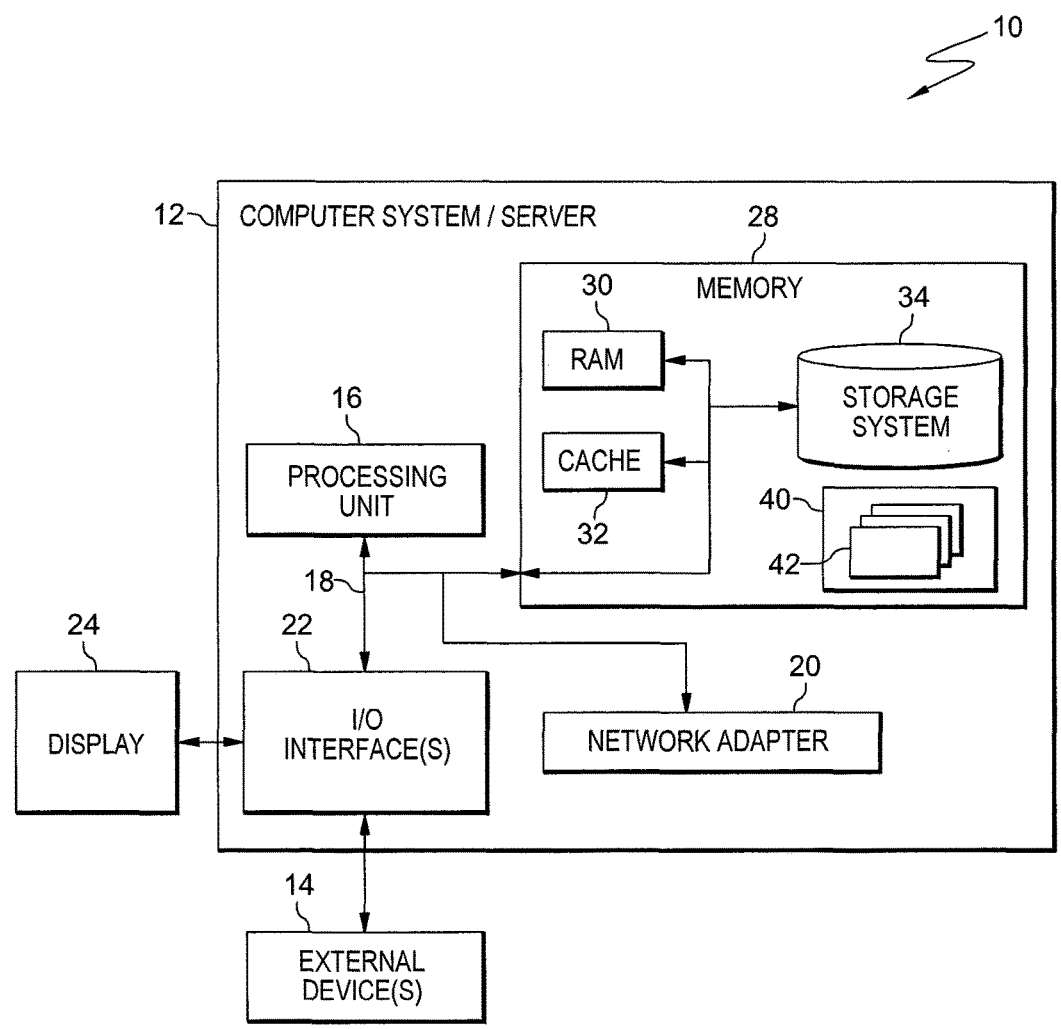
FIG. 6 depicts one embodiment of a cloud computing node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
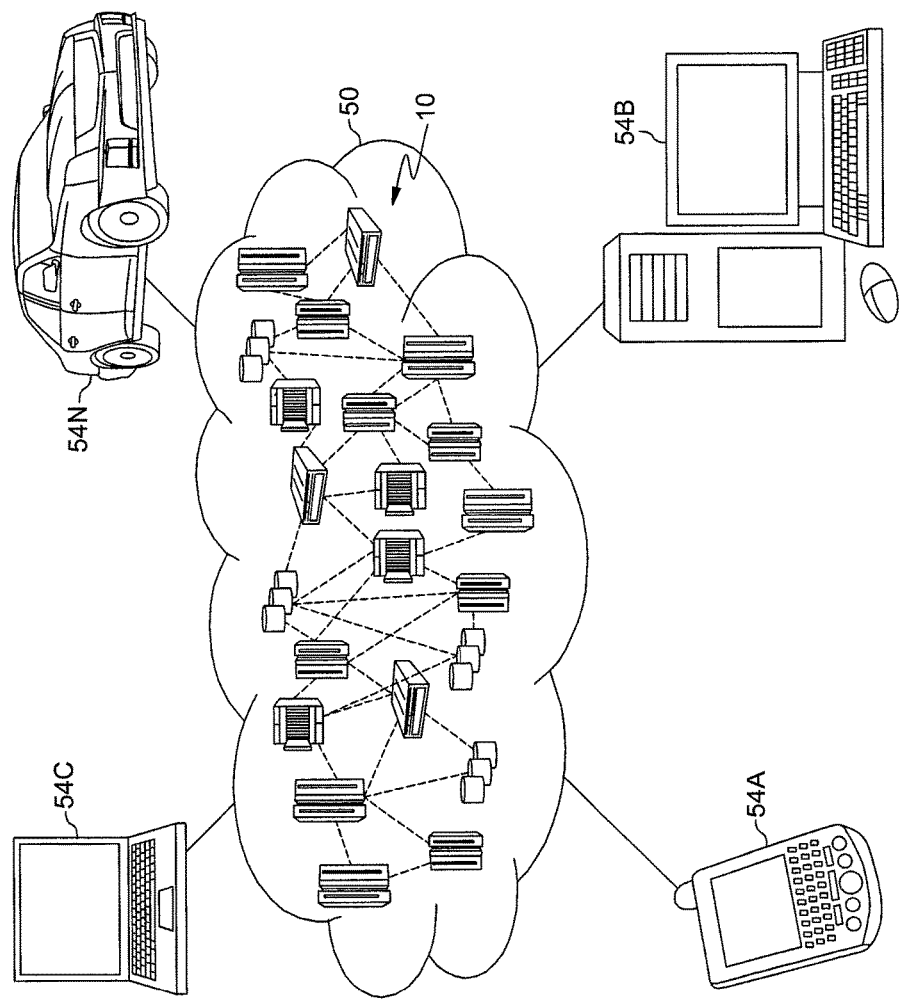
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
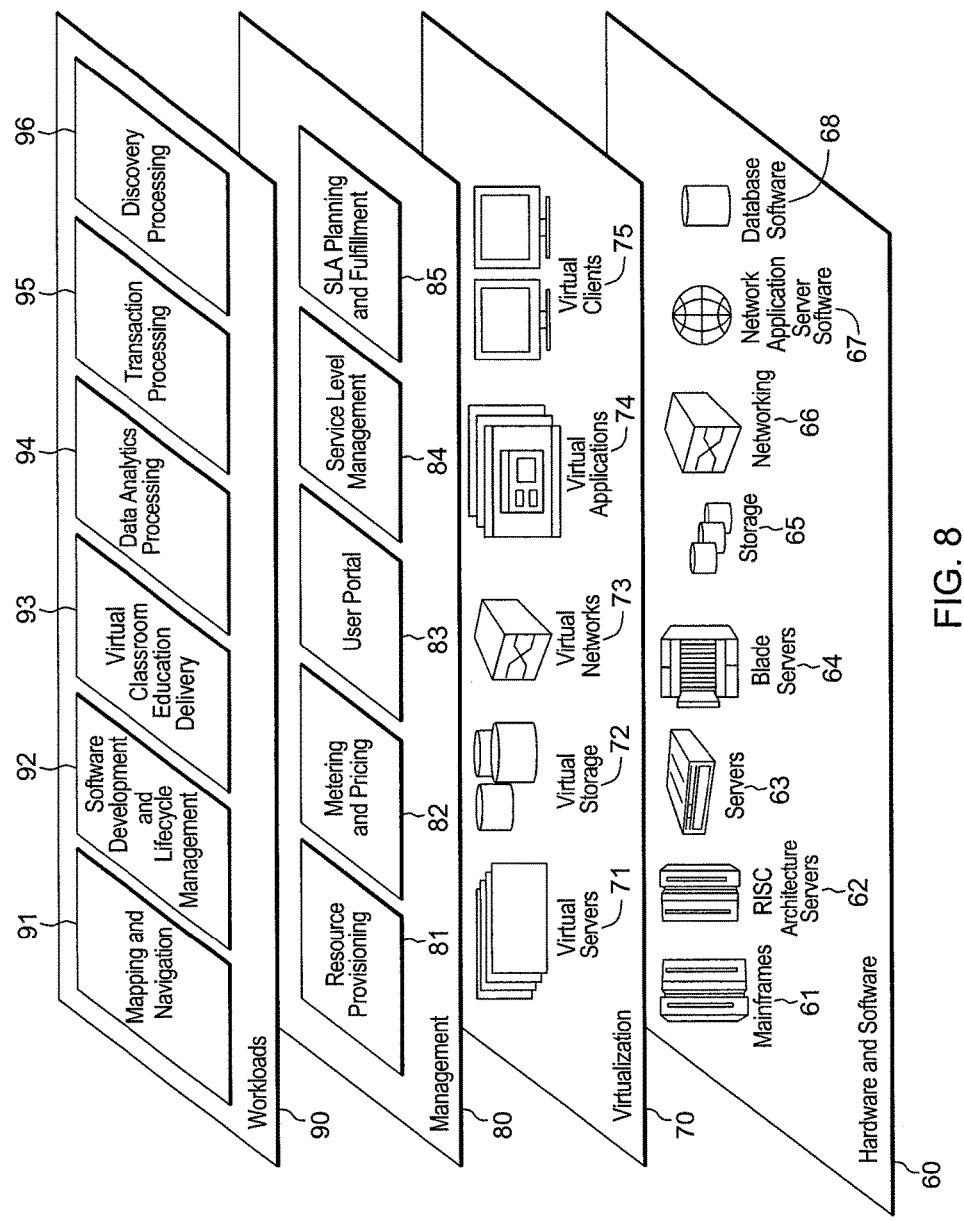
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and discovery processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for performing discovery within a computing environment, said computer program product comprising:
   a computer readable storage medium readable by a processing circuit and storing instructions for execution by the processing circuit for performing a method comprising:
      obtaining, by a machine of the computing environment, at least one of a deployment image or a software catalog to be used in determining products deployed on the machine, the at least one of the deployment image or the software catalog generated based on scanning a template used to create the machine, the template having one or more products at least partially installed, the deployment image comprising information of the one or more products at least partially installed in the template and indicated by the deployment image as being at least partially deployed on the machine, and the software catalog comprising additional information for at least one product of the one or more products; and
      using, by the machine, at least one of the deployment image or the software catalog to perform a targeted discovery of products, of the one or more products, deployed on the machine, in which the information included in the deployment image or the additional information included in the software catalog is obtained and then used in scanning the machine to discover the products of the one or more products.

2. The computer program product of claim 1, wherein the using comprises:
   scanning the machine using the information in the deployment image to determine whether the one or more products indicated in the deployment image are deployed on the machine;
   determining whether the one or more products indicated in the deployment image have been located on the machine; and
   performing processing based on the determining.

3. The computer program product of claim 2, wherein the performing processing comprises:
   completing discovery on the machine based on the determining indicating the one or more products indicated in the deployment image have been located; and
   continuing discovery on the machine based on the determining indicating at least one product of the one or more products in the deployment image has not been located, the continuing discovery comprising scanning the machine using information in the software catalog to determine whether the at least one product that was not located using the deployment image is deployed on the machine.

4. The computer program product of claim 3, wherein based on the completing or the continuing discovery, an output of products deployed on the machine is provided.

5. The computer program product of claim 3, wherein the output of products is to be used in one of licensing, invoicing or rights determination.

6. The computer program product of claim 1, wherein the deployment image includes location information for each of the one or more products, the location information indicating respective installation locations of the one or more products on the machine and the location information to be used in the scanning the machine, including the respective installation locations, for the one or more products, and the software catalog includes alternative location information for the at least one product.

7. The computer program product of claim 1, wherein the template is used to create a plurality of machines of the computing environment, and wherein the template includes a plurality of products to be deployed on the plurality of machines.

8. The computer program product of claim 1, wherein the machine is a virtual machine of a virtual computing environment.

9. The computer program product of claim 8, wherein the template is one template of a plurality of templates generated for the virtual computing environment, and wherein the obtaining comprises receiving from a hypervisor of the virtual computing environment at least an indication of the template to be used for discovery of the machine.

10. The computer program product of claim 1, wherein the method further comprises:
    obtaining a plurality of templates used to create a plurality of machines of the computing environment;
    scanning the plurality of templates to create a plurality of deployment images and a plurality of software catalogs;
    selecting from the plurality of deployment images and the plurality of software catalogs the at least one of the deployment image or the software catalog; and
    providing at least an indication of the at least one of the deployment image or the software catalog to the machine for use in discovery.

11. A computer system for performing discovery within a computing environment, said computer system comprising:

a memory; and a processor in communication with the memory, wherein the computer system is configured to perform a method, said method comprising:

obtaining, by a machine of the computing environment, at least one of a deployment image or a software catalog to be used in determining products deployed on the machine, the at least one of the deployment image or the software catalog generated based on scanning a template used to create the machine, the template having one or more products at least partially installed, the deployment image comprising information of the one or more products at least partially installed in the template and indicated by the deployment image as being at least partially deployed on the machine, and the software catalog comprising additional information for at least one product of the one or more products; and using, by the machine, at least one of the deployment image or the software catalog to perform a targeted discovery of products, of the one or more products, deployed on the machine, in which the information included in the deployment image or the additional information included in the software catalog is obtained and then used in scanning the machine to discover the products of the one or more products.

12. The computer system of claim 11, wherein the using comprises:

scanning the machine using the information in the deployment image to determine whether the one or more products indicated in the deployment image are deployed on the machine;

determining whether the one or more products indicated in the deployment image have been located on the machine; and performing processing based on the determining.

13. The computer program product of claim 12, wherein the performing processing comprises:

completing discovery on the machine based on the determining indicating the one or more products indicated in the deployment image have been located; and continuing discovery on the machine based on the determining indicating at least one product of the one or more products in the deployment image has not been located, the continuing discovery comprising scanning the machine using information in the software catalog to determine whether the at least one product that was not located using the deployment image is deployed on the machine.

14. The computer system of claim 11, wherein the deployment image includes location information for each of the one or more products, the location information indicating respective installation locations of the one or more products on the machine and the location information to be used in the scanning the machine, including the respective installation locations, for the one or more products, and the software catalog includes alternative location information for the at least one product.

15. The computer system of claim 11, wherein the machine is a virtual machine of a virtual computing environment, the template is one template of a plurality of templates generated for the virtual computing environment, and the obtaining comprises receiving from a hypervisor of the virtual computing environment at least an indication of the template to be used for discovery of the machine.

16. A computer-implemented method of performing discovery within a computing environment, said computer-implemented method comprising:

obtaining, by a machine of the computing environment, at least one of a deployment image or a software catalog to be used in determining products deployed on the machine, the at least one of the deployment image or the software catalog generated based on scanning a template used to create the machine, the template having one or more products at least partially installed, the deployment image comprising information of the one or more products at least partially installed in the template and indicated by the deployment image as being at least partially deployed on the machine, and the software catalog comprising additional information for at least one product of the one or more products; and using, by the machine, at least one of the deployment image or the software catalog to perform a targeted discovery of products, of the one or more products, deployed on the machine, in which the information included in the deployment image or the additional information included in the software catalog is obtained and then used in scanning the machine to discover the products of the one or more products.

17. The computer-implemented method of claim 16, wherein the using comprises:

scanning the machine using the information in the deployment image to determine whether the one or more products indicated in the deployment image are deployed on the machine;

determining whether the one or more products indicated in the deployment image have been located on the machine; and performing processing based on the determining.

18. The computer-implemented method of claim 17, wherein the performing processing comprises:

completing discovery on the machine based on the determining indicating the one or more products indicated in the deployment image have been located; and continuing discovery on the machine based on the determining indicating at least one product of the one or more products in the deployment image has not been located, the continuing discovery comprising scanning the machine using information in the software catalog to determine whether the at least one product that was not located using the deployment image is deployed on the machine.

19. The computer-implemented method of claim 16, wherein the deployment image includes location information for each of the one or more products, the location information indicating respective installation locations of the one or more products on the machine and the location information to be used in the scanning the machine, including the respective installation locations, for the one or more products, and the software catalog includes alternative location information for the at least one product.

20. The computer-implemented method of claim 16, wherein the machine is a virtual machine of a virtual computing environment, the template is one template of a plurality of templates generated for the virtual computing environment, and the obtaining comprises receiving from a hypervisor of the virtual computing environment at least an indication of the template to be used for discovery of the machine.

* * * * *